US012723735B2

(12) United States Patent
Li

(10) Patent No.: US 12,723,735 B2
(45) Date of Patent: Sep. 1, 2026

(54) MOBILE LIGHTING SOURCE AND CONTROL METHOD THEREFOR

(71) Applicant: Wenjie Li, Guangdong (CN)

(72) Inventor: Wenjie Li, Guangdong (CN)

( * ) Notice: Subject to any disclaimer, the term of this patent is extended or adjusted under 35 U.S.C. 154(b) by 0 days.

(21) Appl. No.: 19/037,459

(22) Filed: Jan. 27, 2025

(65) Prior Publication Data

US 2026/0202038 A1 Jul. 16, 2026

(30) Foreign Application Priority Data

Jan. 16, 2025 (CN) ......................... 202510067510.9

(51) Int. Cl.
*F21V 5/00* (2018.01)
*F21V 7/04* (2006.01)
*F21V 23/00* (2015.01)

(52) U.S. Cl.
CPC ................ *F21V 5/006* (2013.01); *F21V 7/04* (2013.01); *F21V 23/003* (2013.01)

(58) Field of Classification Search
CPC ................................. F21V 5/006; F21V 5/007
See application file for complete search history.

(56) References Cited

U.S. PATENT DOCUMENTS 11,859,780 B1 1/2024 Li
2011/0188244 A1* 8/2011 Hong ........................ F21V 5/00 362/296.01
2013/0194795 A1* 8/2013 Onaka ................ G02B 19/0066 362/326
2014/0320830 A1 10/2014 De Sisti et al.
2017/0038051 A1* 2/2017 Fukasawa ................. F21V 3/02
2017/0211761 A1* 7/2017 Kuriki ................... F21V 19/002
2018/0172242 A1* 6/2018 Stopa ......................... F21V 5/04
2018/0172292 A1* 6/2018 Braun ..................... F24F 3/167
2020/0014907 A1* 1/2020 Lee ........................ H04N 21/84
2020/0132259 A1 4/2020 Shima et al.
2021/0199875 A1* 7/2021 Okahisa ............... G02B 6/0021
2022/0316683 A1* 10/2022 Yoshida .................. F21V 5/045
2022/0416134 A1* 12/2022 Okahisa ............. H10H 20/8515

FOREIGN PATENT DOCUMENTS

EP 3388741 A1 * 10/2018 ................ F21V 5/04
JP 2013134898 A 7/2013
WO 2018118955 A1 6/2018

OTHER PUBLICATIONS

English Machine Translation of JP-2013134898 (Year: 2013).*

* cited by examiner

*Primary Examiner* — Zheng Song
(74) *Attorney, Agent, or Firm* — Maier & Maier, PLLC

(57) ABSTRACT

A mobile lighting source and control method therefor. The mobile lighting source includes a light source and a lens, where the lens and the light source are disposed coaxially. The light source includes several light regions, the light regions are disposed coaxially, and each of the light regions includes one or several light emitting units. The lens includes several light receiving members, the light receiving members are disposed coaxially, and the light receiving members project received light emitted from the light source to form a required light spot. The mobile lighting source and control method therefor provided in the present application achieve a zoom effect by arranging the lens with multiple light receiving members to refract the light emitted from the light source.

8 Claims, 5 Drawing Sheets

MOBILE LIGHTING SOURCE AND CONTROL METHOD THEREFOR

CROSS-REFERENCE TO RELATED APPLICATIONS

The present application claims priority to Chinese Patent Application No. 202510067510.9, filed on Jan. 16, 2025, the content of all of which is incorporated herein by reference.

TECHNICAL FIELD

The present application relates to the field of lamp manufacturing technologies, and particularly to a mobile lighting source and control method therefor.

BACKGROUND

Existing light sources generally include structures such as aluminum substrates, LED lamp beads, reflective cups, lenses, and light-transmitting covers. For a high-power LED lamp, there are multiple LED lamp beads, and the LED lamp beads each correspond to a lens, where the lens is used to focus light emitted by the LED lamp bead. For a zoomable LED lamp, focusing adjustment is mainly achieved by moving the LED lamp beads and a reflective cup for distance adjustment. This requires additional arrangement of a displacement mechanism in the lamp to move LED lamp beads and the reflective cup for distance adjustment, resulting in an excessively large lamp size.

Therefore, the prior art has defects and shortcomings, and further improvement and development are needed.

SUMMARY

In view of the above shortcomings in the prior art, an objective of the present application is to provide a mobile lighting source and control method therefor, aiming to resolve a problem of an excessive lamp size caused by the addition of a displacement mechanism which is used for focusing adjustment of LED lamps.

The technical solution used in the present application to resolve the technical problem is as follows:

According to a first aspect, an embodiment discloses a mobile lighting source, including a light source and a lens, where the lens and the light source are disposed coaxially.

The light source includes several light regions, the light regions are disposed coaxially, and each of the light regions includes one or several light emitting units.

The lens includes several light receiving members, the light receiving members are disposed coaxially, each of the light receiving members is either an inner light receiving member or an outer light receiving member, each of the light regions is either an inner light region or an outer light region, a light receiving surface of the inner light receiving member faces a light emitting surface of the inner light region, a light receiving surface of the outer light receiving member faces a light emitting surface of the outer light region, and the light receiving members project received light emitted from the light source to form a required light spot.

Optionally, the inner light receiving member and the outer light receiving member are separate structures, a side of the outer light receiving member is provided with a fixed pile, and the inner light receiving member is fixed onto the fixed pile.

Optionally, the lens is formed integrally by the several light receiving members.

Optionally, the light emitting surfaces of the inner light region and the outer light region are not on a same plane, and the light emitting surface of the inner light region is higher than the light emitting surface of the outer light region, or the light emitting surface of the inner light region is lower than the light emitting surface of the outer light region.

Optionally, the light source is a self-luminous body, and irradiation wavelengths of the light emitting units of the light source are a same wavelength or different wavelengths.

Optionally, each light emitting unit in the light regions is multiple optical fibers, light guide columns, reflective prisms, or multiple externally connected non-self-luminous sources, and irradiation wavelengths of the light emitting units of the light source are a same wavelength or different wavelengths.

Optionally, the light receiving member disposed on an outermost side of the lens is a reflective cup lens.

Optionally, the inner light region is a light focusing region, the outer light region is a flood light region, the inner light receiving member is an inner focusing lens, the outer light receiving member is an outer expanding lens, the light focusing region is configured to project light for focusing through the inner focusing lens, and the flood light region is configured to project light for flooding through the outer expanding lens.

According to a second aspect, an embodiment discloses a control method for mobile lighting source, including the following steps:

- S1, obtaining, by a light source, an input light source control signal set, where the light source control signal set is configured to adjust an irradiation parameter of the light source;
- S2, adjusting, by the light source, a light parameter of emitted light based on the light source control signal set, and after adjustment, projecting the light to a lens disposed in front of the light source; and
- S3, projecting, by the lens, the light emitted from the light source, to form a required light spot.

Optionally, the light source control signal set includes a power control signal, a wavelength control signal, and a range control signal; and the step S2 further includes:

- S2*a*, controlling, by the light source, an illumination brightness of each internal light region based on the power control signal;
- S2*b*, controlling, by the light source, an illumination wavelength of each internal light region based on the wavelength control signal; and
- S2*c*, controlling, by the light source, an illumination range of each light region based on the range control signal.

Beneficial Effects

The present application discloses a mobile lighting source and control method therefor. The mobile lighting source includes a light source and a lens, where the lens and the light source are disposed coaxially. The light source includes several light regions, the light regions are disposed coaxially, and each of the light regions includes one or several light emitting units. The lens includes several light receiving members, the light receiving members are disposed coaxially, and the light receiving members project received light emitted from the light source to form a required light spot. The mobile lighting source and control method therefor provided in the present application achieve a zoom effect by arranging the lens with multiple light receiving members to refract the light emitted from the light source. This overcomes the problem of an excessively large structure of the light source itself caused by a need for a complex optical path structure to achieve zooming of the light source, optimizing the structure of the light source and improving the overall compactness of the mobile lighting source.

DESCRIPTION OF REFERENCE NUMERALS IN THE DRAWINGS

110, light source; 120, outer light receiving member; 130, inner light receiving member; 301, diffusion zone; 302, outer light region; 303, light focusing region; and 304, inner light region.

DETAILED DESCRIPTION OF THE EMBODIMENTS

The embodiments of the present application are described in detail below. Examples of the embodiments are shown in the accompanying drawings, and the same or similar reference signs indicate the same or similar components or components with the same or similar functions. The embodiments described below with reference to the accompanying drawings are exemplary, and are only used to explain the present application but should not be construed as a limitation to the present application.

In the prior art, LED lamps usually contain multiple LED lamp beads to increase power. To achieve a better lighting effect, each LED lamp bead corresponds to a lens, and a convex-concave shape of the lens is used for changing a direction of light propagation, thereby focusing the light emitted by each LED lamp bead into a concentrated light beam.

For zoomable LED lamps, focusing adjustment of light is often achieved by moving LED lamp beads and a reflective cup for distance adjustment. This leads to arrangement of a displacement adjustment mechanism in the LED lamp to adjust the distance between the LED lamp beads and the reflective cup. The additional arrangement of the displacement adjustment mechanism causes an excessively large size of the LED lamp, which does not meet the user's need for a small size of an LED lamp.

To overcome the foregoing problem, the present application provides a mobile lighting source and control method therefor. The mobile lighting source includes a light source and a lens, where the lens and the light source are disposed coaxially. The light source includes several light regions, the light regions are disposed coaxially, and each of the light regions includes one or several light emitting units. The lens includes several light receiving members, the light receiving members are disposed coaxially, and the light receiving members project received light emitted from the light source to form a required light spot. The zoom lens is arranged for refraction to achieve a zoom effect, thereby overcoming the problem of an excessively large structure of the light source caused by a need for a complex optical path structure to achieve zooming of the light source, improving the overall compactness of the mobile lighting source.

Below, a more detailed description of the mobile lighting source and control method therefor provided in the present application is made with reference to the accompanying drawings.

Figure 1:
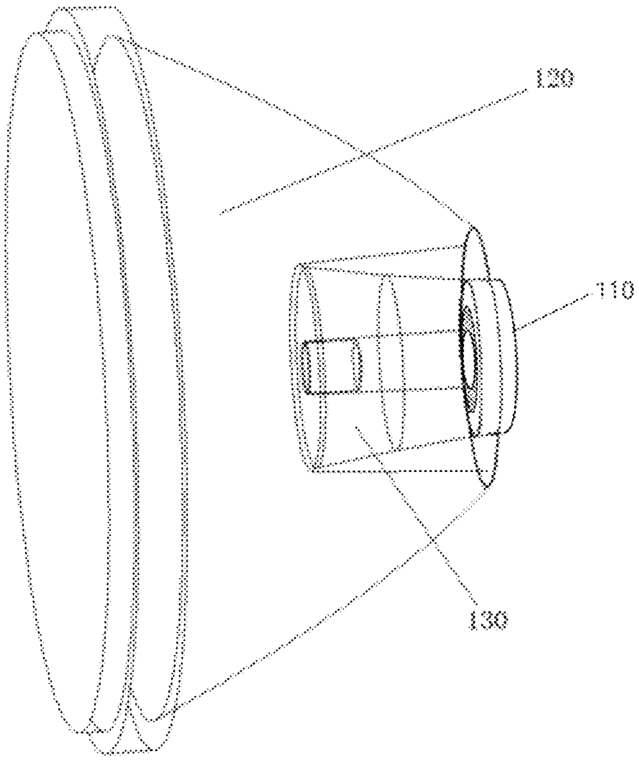
FIG. 1 is a schematic structural three-dimensional diagram of a mobile lighting source according to the present application.

As shown in FIG. 1, the present application provides a mobile lighting source. The mobile lighting source includes a light source 110 and a lens, where the lens and the light source are disposed coaxially. The light source includes several light regions, the light regions are disposed coaxially, and each of the light regions includes one or several light emitting units. The lens includes several light receiving members, the light receiving members are disposed coaxially, each of the light receiving member is either an inner light receiving member or an outer light receiving member, each of the light region is either an inner light region or an outer light region, a light receiving surface of the inner light receiving member faces a light emitting surface of the inner light region, a light receiving surface of the outer light receiving member faces a light emitting surface of the outer light region, and the light receiving members project received light emitted from the light source to form a required light spot.

Further, the lens is arranged in front of the light source, and the lens and the light source are coaxially arranged to ensure that the light emitted from the light source forms high-quality light through the lens. The lens and the light source are coaxially arranged; a main optical axis of the lens coincides with an optical axis of the light source, meaning coaxial arrangement.

Further, the light source includes multiple light regions, and these light regions are also coaxially arranged. Each light region includes one or several light emitting units, where the light emitting unit may be an LED lamp, and various LED lamps in the light region form an LED array.

Further, the lens of the mobile lighting source in the present embodiment includes multiple light receiving members. Each light receiving member receives the light emitted from the light source and refracts the received light emitted from the light source to form a required light spot. Further, the light receiving members are coaxially arranged, meaning that the central axes of the light receiving members are aligned to form a continuous straight line. This ensures that the light from the light source does not deviate or scatter during transmission, thereby improving the optical performance of the mobile lighting source.

Figure 2:
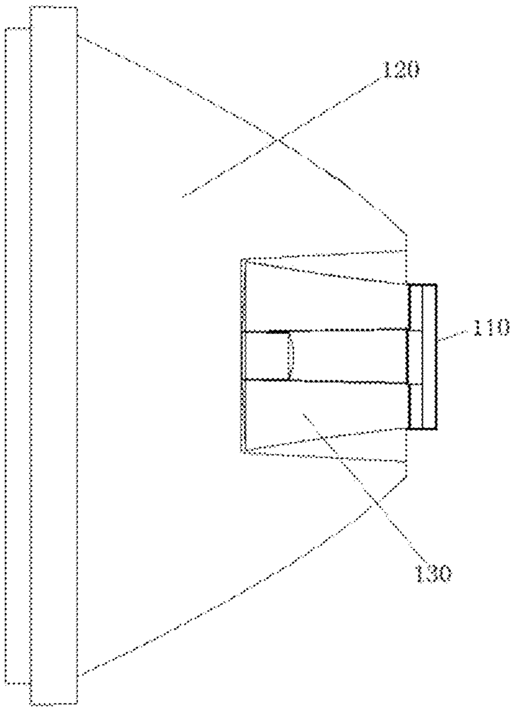
FIG. 2 is a side view of the mobile lighting source according to the present application.

As shown in FIG. 1 and FIG. 2, the light receiving member may be either an inner light receiving member 130 or an outer light receiving member 120. The inner light receiving member is arranged in the outer light receiving member. The inner light receiving member processes and emits the received light from the light source, or the outer light receiving member processes and emits the received light from the light source to form a focused light spot. The inner light receiving member and the outer light receiving member are separate structures, a side of the outer light receiving member is provided with a fixed pile, and the inner light receiving member is fixed onto the fixed pile.

It can be envisioned that in another implementation, the lens is formed integrally by several light receiving members. This not only improves production efficiency in the manufacturing process of the lens, significantly reducing processing steps, but also allows for fast and efficient production of the lens. The inner light receiving member and the outer light receiving member can be directly processed into an integral whole through injection molding or turning process, which not only reduces component assembly errors, ensuring the accuracy and repeatability of the lens, but also improves the optical imaging quality.

The light region is either an inner light region or an outer light region, a light receiving surface of the inner light receiving member faces a light emitting surface of the inner light region, and a light receiving surface of the outer light receiving member faces a light emitting surface of the outer light region. Further, the light emitting surfaces of the inner light region and the outer light region are not on a same plane, and the light emitting surface of the inner light region is higher than the light emitting surface of the outer light region, or the light emitting surface of the inner light region is lower than the light emitting surface of the outer light region.

In an implementation, the light source is a self-luminous body, and irradiation wavelengths of the light emitting units of the light source may be a same wavelength or different wavelengths.

Further, the inner light region includes one or more LED arrays; and the outer light region includes multiple CSP-packaged LED arrays, or COB-packaged LED arrays, or one or more LED arrays. Alternatively, the inner light region includes multiple CSP-packaged LED arrays; and the outer light region includes multiple CSP-packaged LED arrays, or COB-packaged LED arrays, or one or more LED arrays.

In an implementation, each light emitting unit in the light regions is multiple optical fibers, light guide columns, reflective prisms, or multiple externally connected non-self-luminous sources, and irradiation wavelengths of the light emitting units of the light source may be a same wavelength or different wavelengths. Preferably, to achieve a better focusing effect of the light emitted from the light source, the light receiving member disposed on an outermost side of the lens is a reflective cup lens.

As shown in FIG. 1 and FIG. 2, the light receiving members include an inner light receiving member 130 and an outer light receiving member 120. The inner light receiving member 130 is fixed in the outer light receiving member 120; and the light focusing surface of the inner light receiving member 130 is attached to the light emitting surface of the light source. The inner light receiving member 130 and the outer light receiving member 120 have a same center point, and the center point is located on the optical axis of the light source. The outer light receiving member wraps around the inner light receiving member. The inner light receiving member and the outer light receiving member are both used to collect the light emitted from the light source and refract the light, such that the light is focused on the optical axis of the mobile lighting source. The light may alternatively be guided to the outer light receiving member, and the outer light receiving member then focuses the received light onto the optical axis of the mobile lighting source, thereby forming a coaxial light source and achieving focal length adjustment of the light source. The inner light receiving member usually needs to feature high light transmittance and high-temperature resistance, so as to ensure the stability of optical performance. The outer light receiving member is usually made of multiple layers of materials, such as alternating layers of silver and alumina. The radius of the outer light receiving member is greater than the radius of an inner lens to provide imaging space.

As shown in FIG. 2, in an implementation, the inner light receiving member and the outer light receiving member may be arranged as detachable structures. The inner light receiving member 130 and the outer light receiving member 120 form a cup structure. The inner side of the bottom of the cup of the outer light receiving member 120 is provided with a fixed pile. The inner light receiving member is fixed onto the fixed pile and is located in front of the light source 110. The inner light receiving member 130 and the outer light receiving member 120 form a double-layer structure. The outer light receiving member is made of PC material, and the inner light receiving member is made of silicone material. The inner light receiving member is made of silicone material, which can increase the heat resistance temperature of the inner light receiving member, preventing damage to the inner light receiving member and the light source due to excessive temperature during irradiation.

Further, the inner light receiving member includes a lens barrel and lens pieces. The lens pieces are made of glass or other transparent materials, having different shapes and curvatures to achieve the refraction and focusing of the received light. The lens pieces may be plano-convex lenses, bi-convex lenses, concave lenses, or the like. To achieve a better light control effect, the inner light receiving member may further include a filter and a diaphragm, to adjust and control the light. The outer light receiving member may be composed of multiple lenses, which can converge the received divergent light to form a collimated (parallel) beam. During specific implementation, the continuous adjustment of the imaging range can be achieved by changing the focal length or position of the outer light receiving member, thereby meeting different lighting needs. Additionally, the outer light receiving member can optimize the transmission path of the light, improving the illumination quality.

Figure 3:
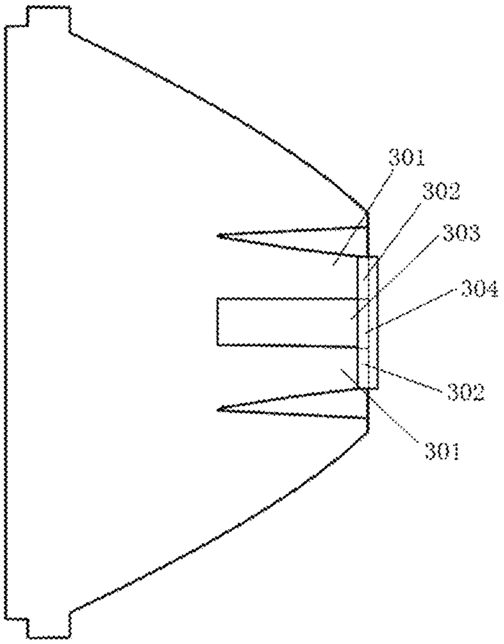
FIG. 3 is a schematic diagram of position distributions of different light regions in the mobile lighting source according to the present application.

Further, as shown in FIG. 3, the light source includes multiple light regions, and the light regions may be divided into an inner light region 304 and an outer light region 302. The inner light region 304 is located in the outer light region, and the inner light region 304 and the outer light region 302 each include multiple light emitting units, each light emitting unit being a coaxial light source.

Further, the light focusing surface of the inner light receiving member includes a light focusing region 303 and a diffusion region 301. When the light focusing surface of the inner light receiving member is closely attached to the light emitting surface of the light source, the light focusing region 303 is closely attached to the inner light region 304, and the diffusion region 301 is closely attached to the outer light region 302. When the light focusing region 303 or the diffusion region 301 is illuminated, the inner lens refracts the received light to produce light spots with different halos, thereby achieving the final coaxial focal length adjustment function. The light focusing surface of the inner lens is designed as a curved surface, which facilitates the reception of light emitted from the light source and focusing of the received light. In the present embodiment, the light focusing surface is closely attached to the light emitting surface of the light source to maximize the utilization and focusing effect of the light. Because the light is captured by the lens after leaving the LED, the scattering and loss of the light are reduced.

In an implementation, the light source is divided into two parts: an inner light region and an outer light region. As shown in FIG. 3, the light source is divided into an inner light region 304 and an outer light region 302. A region on the inner light receiving member is correspondingly divided into a diffusion region 301 and a light focusing region 303. Because the inner light receiving member is closely attached to the light emitting surface of the light source, the inner light region of the light source is closely attached to the light focusing region of the inner lens, and the outer light region of the light source is closely attached to the diffusion region of the inner lens. When the light emitting units in the inner light region are illuminated, the current state is viewed as the light source being in a light focusing mode. When the light emitting units in the outer light region are illuminated, the current state is viewed as the light source being in a flood light mode.

Figure 4:
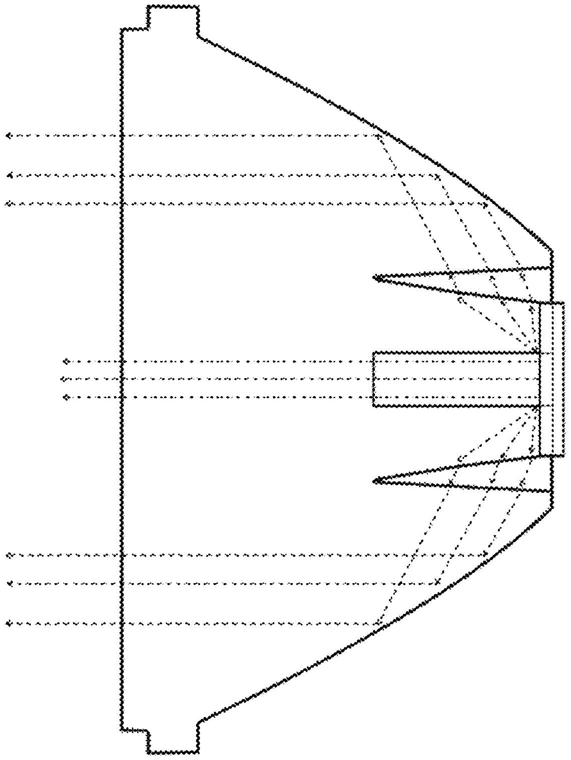
FIG. 4 is a schematic diagram of a refraction path of light when a light source is in a light focusing mode according to the present application.

When the light source is in the light focusing mode, the inner light region is illuminated, and the main emitted light is directly emitted by the light focusing region. The divergent light caused by light leakage can also pass through the diffusion region and then be refracted by the outer light receiving member to be emitted finally. The refraction path of the light in the light focusing mode is shown in FIG. 4.

Figure 5:
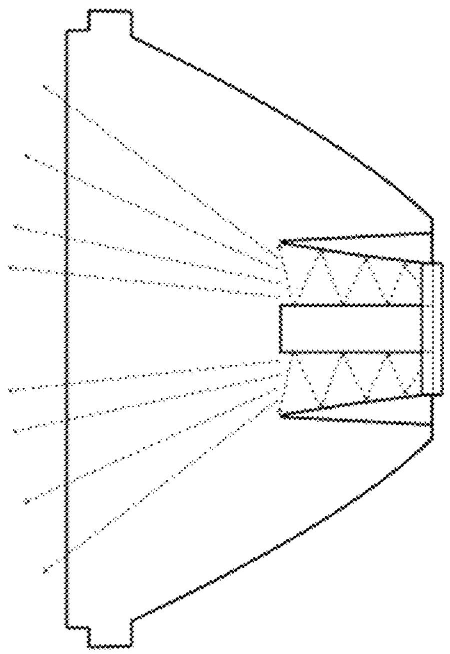
FIG. 5 is a schematic diagram of a refraction path of light when the light source is in a flood light mode according to the present application.

When the light source is in the flood light mode, the light emitting units in the outer light region are illuminated, and the main emitted light is refracted and guided in the diffusion region before being directly emitted. The refraction path of the light is as shown in FIG. 5.

Figure 6:
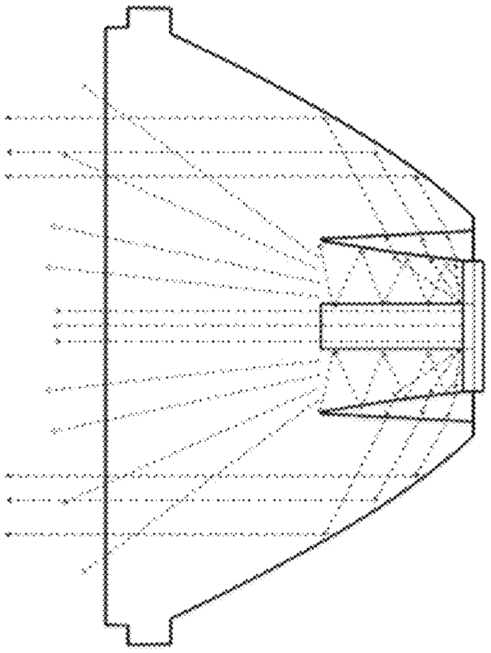
FIG. 6 is a schematic diagram of a refraction path of light when the light source is in a composite state of the light focusing mode and the flood light mode according to the present application.

When the light source is in the composite mode of the light focusing mode and the flood light mode, both the inner light region and the outer light region are illuminated simultaneously. The refraction path of the light is shown in FIG. 6, which is a superposition of the light focusing mode and the flood light mode.

It can be envisioned that when both the inner light region 304 and the outer light region 302 are illuminated simultaneously, the light source 110 can adjust the focusing and flood effects of the light spot by adjusting the brightness of the light emitted from the inner light region 304 and the outer light region 302. Further, when the light source 110 adjusts the brightness of the light emitted from the inner light region 304 to be greater than the brightness of the light emitted from the outer light region 302, the light spot emitted from the light source 110 tends to be in a focused state. Conversely, when the light source 110 adjusts the brightness of the light emitted from the inner light region 304 to be less than the brightness of the light emitted from the outer light region 302, the light spot emitted from the light source 110 tends to be in a flood state.

Figure 7:
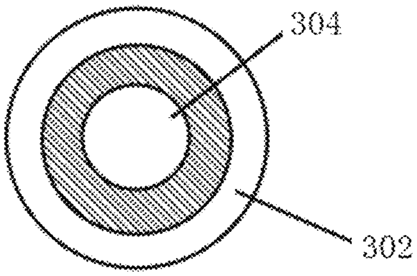
FIG. 7 is a schematic diagram of distributions of an inner light region and an outer light region according to the present application.

Further, as shown in FIG. 7, the inner light region and the outer light region may both be of an annular structure. The inner light region is located in the outer light region, that is, the outer light region surrounds the inner light region. The light source can separately control the light emitting units in the inner light region or the light emitting units in the outer light region to emit light, such that the light emitted from the inner light region is emitted through the light focusing region of the inner light receiving member, or the light emitted from the light emitting units in the outer light region is refracted and guided by the diffusion region of the inner light receiving member before being directly emitted.

Further, the inner light region or the outer light region includes multiple light emitting regions, each light emitting region including multiple light emitting units therein. The light emitting regions in the inner light region and the outer light region are regularly arranged, and the light emitting units in the inner light region are surrounded by the light emitting units in the outer light region.

The multiple light emitting units in the inner light region and the outer light region are each of an annular structure, a square structure, or a fan-shaped structure. Further, as shown in FIG. 7, the overall light source is circular, where the inner light region 304 is designed to be circular, and the outer light region 302 is designed to be annular, with the inner light region 304 in the outer light region 302. The overall light source is of a rectangular structure, where the inner light region 304 is located at the center, and the outer light region 302 is divided into 8 regions, located above, below, left, right, upper right, lower right, upper left, and lower left of the inner light region 304. Additionally, the overall shape of the light source may alternatively be arranged as a regular hexagon, where the inner light region 304 is located at the center of the hexagon, and the outer light region 302 is divided into six regions, evenly arranged at fixed intervals in a circular ring around the inner light region.

In an implementation, the inner light region and the outer light region are self-luminous bodies. The inner light region includes one or more LED arrays, or multiple CSP-packaged LED arrays. The outer light region includes multiple CSP-packaged LED arrays, or COB-packaged LED arrays, or one or more LED arrays. In other words, the inner light region includes one or more LEDs, and the outer light region includes multiple CSP light emitting chip arrays. Alternatively, the inner light region includes multiple CSP-packaged LED arrays, and the outer light region includes multiple CSP-packaged LED arrays or COB-packaged LED arrays.

It can be envisioned that the light emitting units in the outer light region may be composed of several regularly arranged LED chips or directly combined from COB light sources.

The light emitted from the inner light region and the light emitted from the outer light region may be light sources with the same wavelength or different wavelengths. Further, when the inner light region or the outer light region is a self-luminous light source composed of several CSP light emitting chips or several LED light emitting chips, the CSP light emitting chips or LED light emitting chips arranged in adjacent or different light emitting regions (the inner light region and the outer light region are divided into several light emitting regions, and the light emitting regions are of an unlimited shape, such as a fan-shape or square) may be light sources with the same wavelength or different wavelengths.

In another implementation, the light emitting units in the inner light region or the light emitting units in the outer light region may be multiple optical fibers or multiple externally connected non-self-luminous sources, and the wavelength of each light emitting unit in the inner light region is the same as or different from the wavelength of each light emitting unit in the outer light region.

When the inner light region or the outer light region is a non-self-luminous light source composed of several optical fibers or several external light guide elements, the optical fibers or external light guide elements corresponding to adjacent or different light emitting regions (the inner light region and the outer light region are divided into several light emitting regions, and the light emitting regions are of an unlimited shape, such as a fan-shape or square) may be connected to external light sources and conduct light sources of the same or different wavelengths.

Further, the light focusing surface of the inner light receiving member includes a light focusing region and a diffusion region. The light focusing region is closely attached to the inner light region, and the diffusion region is closely attached to the outer light region. The light focusing region or the diffusion region refracts the received light and outputs light spots with different halos.

Figure 8:
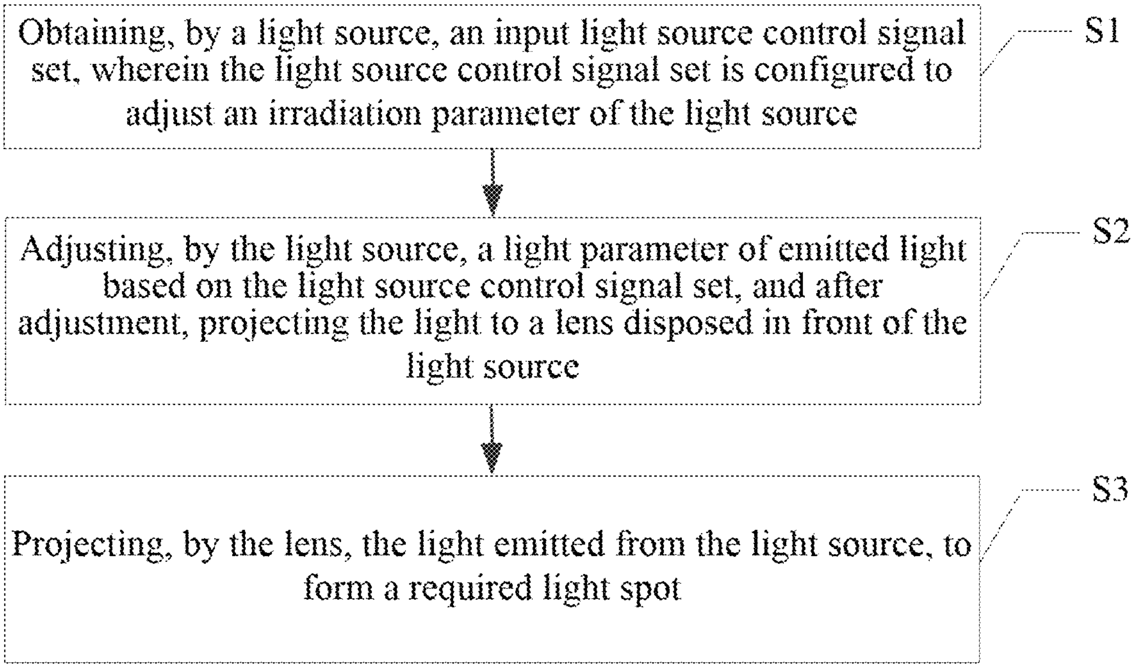
FIG. 8 is a flowchart of steps of a control method for mobile lighting source according to the present application.

Furthermore, in addition to the above mobile lighting source, this embodiment provides a control method for mobile lighting source, as shown in FIG. 8, including the following steps:

Step S1, obtaining, by a light source, an input light source control signal set, wherein the light source control signal set is configured to adjust an irradiation parameter of the light source.

The light source control signal set includes multiple different control signals, and these control signals may be used for adjusting various irradiation parameters of the light source, such as brightness, color temperature, or color. The input control signals of the light source control signal set can meet the diverse needs of the light source in different use scenarios.

When the light source receives a series of input control signals of the light source control signal set, it controls each light emitting unit in the light source based on the control signals included in the light source control signal set, so as to adjust the irradiation parameter of each light emitting unit.

Step S2, adjusting, by the light source, a light parameter of emitted light based on the light source control signal set, and after adjustment, projecting the light to a lens disposed in front of the light source.

After each light emitting unit in the light source makes corresponding light parameter adjustment based on the control signal included in the light source control signal set, the emitted light is projected onto the surface of the lens in front of the light source.

Figure 9:
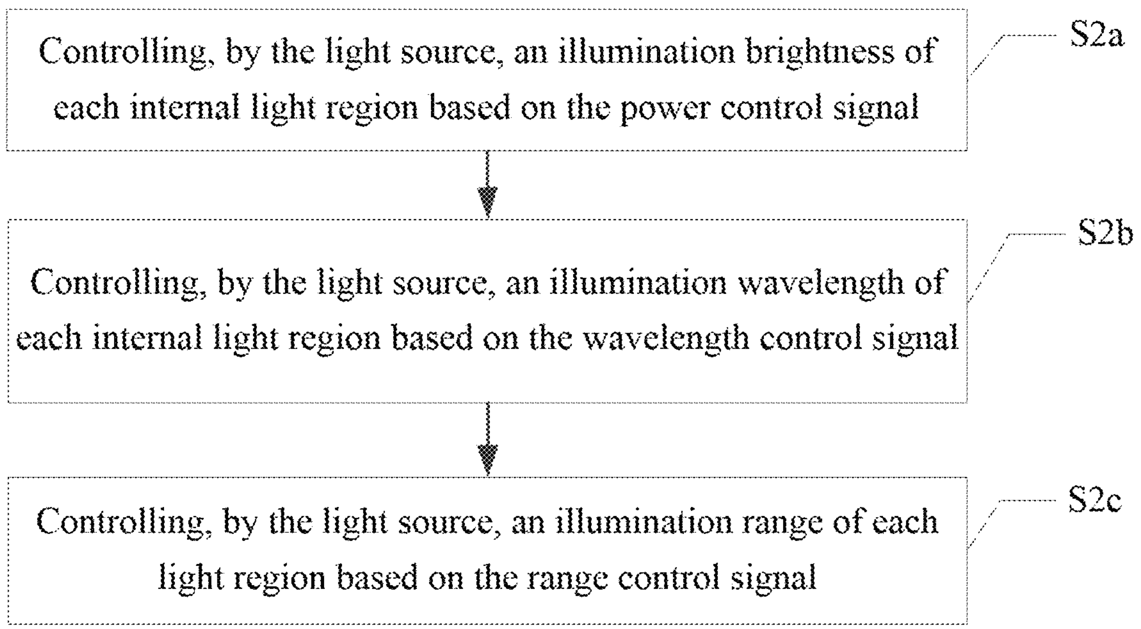
FIG. 9 is a flowchart of steps for adjusting light emitted from the light source in the control method according to the present application.

Further, the light source control signal set includes a power control signal, a wavelength control signal, and a range control signal, and as shown in FIG. 9, step S2 specifically includes the following steps:

Step S2*a*, controlling, by the light source, an illumination brightness of each internal light region based on the power control signal.

The light source controls the light emitting power of each light emitting unit based on the received power control signal, thereby controlling the illumination brightness of each internal light region.

Step 2*b*, controlling, by the light source, an illumination wavelength of each internal light region based on the wavelength control signal.

The light source controls, based on the received wavelength control signal, the wavelength of the light emitted from each light emitting unit, thereby controlling the illumination wavelength of each internal light region.

Step S2*c*, controlling, by the light source, an illumination range of each light region based on the range control signal.

The light source controls, based on the received range control signal, the irradiation range of the light projected by each light emitting unit, thereby controlling the illumination range of each internal light region.

The light source control signal set is conducive to achieving control over the illumination brightness, the illumination wavelength, and the illumination range of each internal light region by respectively controlling the power of the light source, the wavelength of the emitted light, and the irradiation range of the emitted light.

Step S3, projecting, by the lens, the light emitted from the light source, to form a required light spot.

After the lens receives the light emitted from the light source, it projects the received light to form the required light spot, as shown in FIG. 4 to FIG. 6.

The lens includes multiple light receiving members, and the light receiving members include inner light receiving members and outer light receiving members. Both the inner light receiving members and outer light receiving members are used to collect the light emitted from the light source and refract the light, such that the refracted light is focused onto the optical axis of the light source, thereby achieving light focusing, maintaining the compact structure of the light source, and avoiding an excessively large structure of the light source.

According to the mobile lighting source and control method therefor provided in this embodiment, the light emitted from the light source is refracted via a zoom lens, to keep the light emitted from the light source in a coaxial state and on the same plane, eliminating the need for a complex physical displacement structure to move the light source to achieve a zooming technical effect, thus allowing for a more compacted optical structure. This resolves the problem in the prior art that a zoomable light source needs to be implemented under driving of a physical displacement mechanism, resulting in an excessively large structure of the light source itself, thereby ensuring the zoom effect while reducing the size of the structure of the light source.

In the description of the present application, it is to be understood that the terms “central”, “longitudinal”, “transverse”, “upper”, “lower”, “front”, “back”, “left”, “right”, “vertical”, “horizontal”, “top”, “bottom”, “inner”, “outer”, and the like indicate azimuthal or positional relations on the basis of those shown in the drawings only for ease of description of the present application and for simplicity of description, and are not intended to indicate or imply that the referenced apparatus or element must have a particular orientation and be constructed and operative in a particular orientation, and thus may not be construed as a limitation on the present application. In addition, the terms “first” and “second” are merely for the purpose of description, and shall not be understood as any indication or implication of relative importance or any implicit indication of the number of technical features indicated. Therefore, a feature limited by “first” or “second” may explicitly or implicitly include one or more features. In the description of the present application, unless otherwise specified, “multiple” and “several” mean two or more.

It should be understood that the content of the present application is not limited to the foregoing examples, and those skilled in the art can make improvements or transformations according to the above descriptions, and all these improvements and transformations should belong to the protection scope of the appended claims of the present application.

What is claimed is:

1. A mobile lighting source, comprising a light source and a lens, wherein:

the lens and the light source are disposed coaxially with respect to each other;

the light source comprises a plurality of light regions, each of the light regions is either an inner light region or an outer light region, the inner light region and the outer light region are disposed coaxially with respect to each other, the outer light region surrounds the inner light region, and each of the light regions comprises one or a plurality of light emitting units; and the lens comprises a plurality of light receiving members, each of the light receiving members is either an inner light receiving member or an outer light receiving member, the inner light receiving member and the outer light receiving member are disposed coaxially with respect to each other, and the outer light receiving member surrounds the inner light receiving member;

the inner light receiving member comprises a light focusing region and a diffusion region, the light focusing region and the diffusion region are disposed coaxially with respect to each other, and the diffusion region surrounds the light focusing region;

a light receiving surface of the light focusing region faces a light emitting surface of the inner light region, and a light receiving surface of the diffusion region faces a light emitting surface of the outer light region;

the light receiving members project received light emitted from the light source to form a required light spot; and the inner light receiving member comprises a lens barrel.

2. The mobile lighting source according to claim 1, wherein the inner light receiving member and the outer light receiving member are separate structures.

3. The mobile lighting source according to claim 1, wherein the lens is formed integrally by the plurality of light receiving members.

4. The mobile lighting source according to claim 1, wherein the light emitting surfaces of the inner light region and the outer light region are not on a same plane, and the light emitting surface of the inner light region is higher than the light emitting surface of the outer light region, or the light emitting surface of the inner light region is lower than the light emitting surface of the outer light region.

5. The mobile lighting source according to claim 1, wherein the light source is a self-luminous body, and irradiation wavelengths of the light emitting units of the light source are a same wavelength or different wavelengths.

6. The mobile lighting source according to claim 1, wherein each light emitting unit of the light regions is multiple optical fibers, light guide columns, reflective prisms, or multiple externally connected non-self-luminous sources, and irradiation wavelengths of the light emitting units of the light source are a same wavelength or different wavelengths.

7. The mobile lighting source according to claim 1, wherein the outer light receiving member is a reflective cup lens.

8. The mobile lighting source according to claim 1, wherein:

in a light focusing mode, the inner light region is illuminated, light emitted by the inner light region is focused by the light focusing region, divergent light caused by light leakage passes through the diffusion region and is refracted by the outer light receiving member;

in a flood light mode, the outer light region is illuminated, and light emitted by the outer light region is refracted by the diffusion region; and in a composite mode, both the inner light region and the outer light region are illuminated.

* * * * *